United States Patent [19]

Thompson

[11] Patent Number: 5,366,779

[45] Date of Patent: Nov. 22, 1994

[54] FLOOR COVERING WITH BITUMEN BACKING LAYER

[75] Inventor: Andrew Thompson, Belfast, United Kingdom

[73] Assignee: Interface, Inc., Atlanta, Ga.

[21] Appl. No.: 191,802

[22] Filed: Feb. 3, 1994

Related U.S. Application Data

[63] Continuation-in-part of Ser. No. 930,608, Sep. 29, 1992, abandoned.

[30] Foreign Application Priority Data

Apr. 10, 1990 [GB] United Kingdom ............. 9008166.2

[51] Int. Cl.$^5$ .................. B32B 5/02; B32B 11/10; C08L 95/00
[52] U.S. Cl. ..................................... 428/96; 428/97; 428/291; 428/489; 524/59; 524/68; 524/914; 524/915
[58] Field of Search ................ 524/59, 68, 914, 915; 428/291, 489, 96, 97

[56] References Cited

U.S. PATENT DOCUMENTS

| | | | |
|---|---|---|---|
| 3,853,800 | 12/1974 | Haberl | 524/59 |
| 4,201,812 | 5/1980 | Blanken et al. | 428/95 |
| 4,868,223 | 9/1989 | Moran | 524/59 |
| 4,987,166 | 1/1991 | Jacono et al. | 524/68 |

FOREIGN PATENT DOCUMENTS

| | | | |
|---|---|---|---|
| 0299700 | 1/1989 | European Pat. Off. | |
| 3527525 | 2/1987 | Germany | |
| 0123862 | 5/1989 | Japan | |
| 1417571 | 10/1975 | United Kingdom | |
| 2219802 | 12/1989 | United Kingdom | |
| 2223229 | 4/1990 | United Kingdom | 524/59 |

*Primary Examiner*—Peter Szekely
*Attorney, Agent, or Firm*—Richard P. Crowley

[57] ABSTRACT

A floor covering having a bitumen composition as a backing layer, such as carpet tiles, which bitumen composition comprises straight run bitumen and a mixture of high density and low density polyethylene polymers blended and dispersed in the straight run bitumen as a continuous phase in an amount of up to about 12% by weight and which bitumen composition contains a minimum of about 40% by weight of a mineral filler material, such as limestone, and the bitumen composition having improved dimensional stability, adhesion, static loading and electrical conductivity and having lower cost and processing advantages.

18 Claims, No Drawings

FLOOR COVERING WITH BITUMEN BACKING LAYER

REFERENCE TO PRIOR APPLICATIONS

This application is a continuation-in-part application of U.S. patent application Ser. No. 07/930,608, filed Sep. 29, 1992, now abandoned, which application is the national phase of PCT/GB91/00553, filed Apr. 9, 1991, which application is based upon Great Britain 9008166.2, filed Apr. 10, 1990, all of which applications are hereby incorporated by reference.

BACKGROUND OF THE INVENTION

Oxidized and polymer-modified bitumens are frequently used as a backing material in the manufacture of carpet tiles. The construction of these tiles are fairly complex and may consist of a fibrous, e.g. tufted, primary cloth which has been impregnated with a cured latex to stabilize the tufting, and laminated to a secondary backing cloth using the aforementioned bitumen.

In this application, severe physical demands are placed on the bitumen to control stress relaxation in the primary tufting cloth, to maintain and retain critical physical dimensions over a wide range of possible application conditions, to prevent excessive build up to static electricity which may damage electrical and computer hardware as well as physical discomfort to building occupants; and to maintain physical dimensions under static loading conditions such as would occur when heavy objects are placed on carpet tiles over an extended period of time.

The bitumen used must also possess characteristics in the molten phase which will allow easy preparation and processing, i.e. a suitable viscosity at application temperatures with maximum thermal stability and minimum dimensional instability when applied to the manufactured product.

It has been proposed in U.K. patent application GB 2 219 802 A (Vulcanite Ltd.) to incorporate a low density polyethylene into bitumen for roofing and carpet tile backing purposes. It has been found that such blends do not fulfill all of the demands placed on a bitumen used in the contact of a carpet tile backing. The static loading and dimensional stability of a carpet tile produced using such a bitumen would not be commercially acceptable and would fall outside the standard requirements laid down by the carpet tile and floor laminating industry.

Self-adhesive bitumen compositions containing polyethylene or crystalline polypropylene have been suggested for use in carpet tiles with a self-adhesive backing in GB Pat. 1 417 571 (Ruberoid Ltd.). Further, carpet tiles have been prepared employing a blend of bitumen and a minor amount of a thermoplastic styrene-butadiene-styrene block copolymer (SBS) as the integral backing layer styrene-butadiene-styrene block copolymer (SBS) as the integral backing layer in U.S. Pat. 4,201,812 (Shell Oil Company). However, the block copolymer presents processing, compatibility, cost and other difficulties in its use as a carpet backing blend.

SUMMARY OF THE INVENTION

This invention relates to bitumen compositions having improved dimensional stability, adhesion, static loading and electrical conductivity characteristics, particularly, but not exclusively, such compositions for use in the production of carpet tiles, flooring and other laminating applications.

According to the present invention, there is provided a floor covering having a bitumen composition as a backing layer and a method of preparing the floor covering which fulfills all of the demands described earlier and also provides considerable cost saving advantage over systems described earlier and already in operation.

The present invention comprises a floor covering having bitumen composition backing layer, which bitumen composition comprises:
a) dispersed phase of straight run bitumen;
b) a continuous phase of a mixture of low density polyethylene and a high density polyethylene;
the bitumen composition having a softening point of about 110° C. to 128° C. and a penetration value of about 10 dmm to 15 dmm.

The present invention also comprises a method of preparing a floor covering having a bitumen composition backing layer and a fibrous face surface and a back surface, the bitumen composition backing layer bonded to the back surface. The method comprises admixing a heated, straight run bitumen with a mixture of a low density and high density polyethylene to provide a homogeneous dispersion with the straight run bitumen as the dispersed phase in a continuous phase of the polyethylene to provide a bitumen backing composition having a softening point of about 115° C. to 128° C. and a penetration value of about 10 to 15 dmm. The method includes heating the bitumen backing composition, for example, to a temperature of about 160° C. to 180° C. at a coating application station, applying the heated bitumen backing composition to the back surface of the floor covering and recovering a floor covering, such as a carpet tile, having the bitumen composition as the backing layer.

In one embodiment, this invention relates to a bitumen-polymer filler blend suitable for use as a flooring of a laminate backing layer. The blend may comprise a minimum inert filler material content of about 40% w/w of the final blend. The bituminous component comprises a straight run bitumen typically of high asphaltene and resin content with a penetration value (IP 49/83) of up to 200 dmm, and also containing a mixture of low density and high density polyethylenes. Generally, the total polyethylene content does not exceed about 12%, such as 10% w/w, of the final blend.

The present invention provides a bitumen composition useful as a backing layer for carpet tiles which composition is low cost and can be manufactured from locally available materials, that is, straight run bitumen rather than blown or oxidized bitumen and either virgin or preferably low cost scrap or recycled polyethylene as a modifier. Low cost, branched chain polyethylene, readily available as scrap material, is preferred. The bitumen-polyethylene blends employed as a backing layer provide carpet tiles of improved dimensional stability and better electrical conductivity, so that an antistatic agent may not be required to meet existing IBM-/ICL standards for conductivity.

In addition, the bitumen-polyethylene composition provides better adhesion due to the increased tackiness of the bitumen composition, so that there is an improved quality of lamination between the bitumen backing layer and the back surface of the latex-coated and cured, primary, needle-punched or tufted backing sheet. The bitumen composition permits a reduction in the application or coating temperature, resulting in energy savings and permitting the use of less expensive, lower melting point secondary backing sheets on the back surface of the tile, for example, the use of non-woven polypropylene sheets in place of higher melting point polyester or polyester-polypropylene backing sheets. The carpet tile produced has a fibrous face surface and a back surface integrally bonded to the bitumen composition as a backing layer and typically a secondary backing sheet secured to the back surface of the bitumen backing layer.

In comparison to the use of styrene-butadiene-styrene block copolymers, there are no problems relating to bitumen compatibility, the bitumen is not temperature sensitive, does not cross link in prolonged storage at high temperature and does not require a special bitumen composition with hazardous components.

The bitumen-polyethylene blend composition used in the invention should have a softening point of about 110° C. to 128° C., e.g. 115° C. to 124° C., and a penetration of about 10 dmm to 15 dmm, e.g. 10 dmm to 12 dmm. The softening point (ring and ball test) and penetration values are measured in accordance with the Institute of Petroleum specifications, respectively IP 58/83 and IP 49/83. The bitumen composition is prepared by heating the bitumen to about 180° C. to 200° C., e.g. 190° C., and the polyethylene polymers are then added, typically with the high density polyethylene added first and the polyethylene polymer mixed with continuous agitation with moderate shear for sufficient time, e.g. over 60 minutes, until a smooth, homogeneous dispersion is obtained, that is, until the bitumen is dispersed as a dispersed phase in a continuous phase of the polyethylene. Generally, the quality of the dispersion may be monitored wherein a sample of the blend is viewed under ultraviolet illumination to affect fluorescence of the polymer so the quality of the blend can be visually assessed.

The bitumen composition is employed as a backing layer for floor laminates, particularly carpet tiles, by heating the bitumen composition and applying one or more coating layers to the back surface of a fibrous face floor surface covering. Generally, the bitumen composition is applied at a temperature of 160° C. to 180° C., e.g. 165° C. to 170° C., at the coating or application station, which is a lower than normal coating temperature with blown bitumen, and at a viscosity of 6,000 cps up to about 125,000 cps (6 to 125pascal seconds), e.g. 20,000 cps to 40,000 cps (20 to 45 pascal seconds). Generally, SBS-modified bitumens are applied as backing layers at temperatures of 180° C. to 190° C.; however, at lower temperatures of 160° C. to 170° C. and less, the viscosity of the high density polyethylene (HDPE) and low density polyethylene (LDPE) modified straight run bitumen does not increase as rapidly as the viscosity of blown or oxidized bitumen, so that application at lower temperatures with resulting savings in energy cost and the use of less expensive secondary backing are obtained. The lower application temperature permits the use of low melting point, 16C,° C. to 170° C., 100% polypropylene, non-woven or other sheet material as a secondary backing. The bitumen may be applied in any manner, such as by lick roller, a lay-in technique, or a knife coater. Where a lick roller applicator is used, a lower viscosity bitumen composition is employed, e.g. 6 to 40 pascal seconds, while a knife coater permits the use of a higher viscosity bitumen composition, e.g. 10 to 100 pascal seconds.

The bitumen composition employs straight run bitumen generally of high asphaltene and resin content and which may have penetration of up to 200 dmm or less, typically less than about 100 dmm, e.g. 30 dmm to 60 dmm, particularly 40 dmm to 60 dmm. Straight run bitumen is more readily available and of lower cost and lower viscosity than blown bitumen. Generally, the bitumen consists of all straight run bitumen; however, very minor amounts, for example, up to about 10% by weight of other bitumens, such as blown bitumen or other hydrocarbon products, can be incorporated if desired.

The straight run bitumen is blended with a mixture of high density and low density polyethylene polymers in an amount sufficient to form a dominant, continuous phase of the polyethylene polymer. Once the polyethylene concentration has reached the phase transition level, further polyethylene polymer addition does not increase the softening point of the bitumen blend Generally, the polyethylene is employed in total amounts of up to about 12% by weight, e.g. between 8% to 10%. For example, the HDPE may range from about 0.5% to 3.0% by weight, such as 1% to 2%, while the LDPE may range from about 3.0% to 9.5% by weight, such as 3% to 6% or higher, where a higher penetration value, straight run bitumen is used, but generally less than 12% w/w. It has been found that the use of a moderate density polyethylene to reduce the softening point of the straight run bitumen is not satisfactory due to the large concentrations required, and that processing and cost factors make its use unsatisfactory. The use of low density polyethylene alone is also not satisfactory to produce a commercially acceptable bitumen backing composition for carpet tile of defined penetration value and softening point.

The properties of polyethylenes are dependent upon their molecular configurations, molecular weights and molecular weight distributions. An important factor is the selection and blending of the polyethylenes used. Commercially, polyethylenes are graded in terms of the density and the melt flow index, with both measurements necessary to define any particular grade. The melt flow index (MFI) is the number of grams of a polymer that can be forced through a 0.0825-inch (2.1 mm) orifice in 10 minutes at 190° C. by a pressure of 2,160 grams (ASTM D1238-70).

Typically, the high density polyethylene component should have a density between about 0.935 g/m$^3$ and 0.970 g/m$^3$, and a melt flow index greater than about 0.2, such as 0.2 to 10, e.g. 4 to 8. The low density component of this invention should have a density of about 0.90 g/m$^3$ and 0.93 g/m$^3$, and a melt flow index greater than about 0.2, such as 0.5 to 5.0.

Generally, the bitumen composition includes an inert mineral filler material to reduce cost and to prevent cold flow of the composition in use, such as the use of slate dust or limestone, in amounts of greater than about 40% by weight, such as between about 40% to 65% by weight, and typically 50% to 55% The bitumen composition may contain a wide variety of various modifiers and additives commonly used in carpet tile backing layers, provided such modifiers and additives are not detrimental to the accepted quality of the backing layer. Such modifiers and additives may include, but not be limited to: antistatic agents, such as fatty amines; and carbon black, including master batch mixtures of polyethylene and carbon black, for example, HDPE and LDPE with carbon black used for incorporating into the bitumen blend; other fillers; pigments for color; and minor amounts of other polymers and additives.

The invention will be described for the purposes of illustration only in connection with certain embodiments; however, it is recognized that various changes, modifications, additions and improvements may be made to the invention as illustrated by a person skilled in the art, all falling within the spirit and scope of the invention.

DESCRIPTION OF THE EMBODIMENTS

A Hubis mixer was charged with 311 Kg of 50 penetration (IP 49/83) straight run bitumen at 190° C. and 28 Kgs of LDPE (MFI 3, density 0.92 g/m$^3$), and 10.5 Kgs of HDPE (MFI 4, density 0.95 g/m$^3$) were added, and the mixing cycle started. After 10 minutes, a sample of the blend was removed for ultraviolet examination of assess blend quality. The mixing was then continued in 10-minute cycles until no further improvement in the quality of the dispersion could be observed. When this point was reached, 350 Kgs of limestone filler was added to produce a final batch weight of 700 Kgs. The batch was used to manufacture sample tiles employing a lick roller to apply the bitumen to the back surface of a flooring substrate with the bitumen temperature at the application point of 153° C. to 162° C. The polyethylenebitumen composition had a softening point of 121° C. (IP 58/83), a penetration of 10 dmm (IP 49/83), and a viscosity temperature profile as follows:

| Viscosity (pascal seconds) | Temperature (C.°) |
|---|---|
| 47.0 | 130 |
| 30.0 | 140 |
| 20.0 | 150 |
| 14.0 | 160 |
| 9.5 | 170 |
| 7.5 | 180 |
| 6.0 | 190 |

Dispersion Quality

It was found that the best obtainable dispersion was produced after 20 to 30 minutes, using the high speed disintegrator. Carpet tiles so manufactured were compared with similar commercial carpet tiles known as Collage (a trademark of Interface Flooring Systems, Inc.) as a control tile and made in the same manner, except with blown bitumen applied at 190° C.

| Results | Full Scale Industrial Trial | |
|---|---|---|
| | Collage Control Tile | Polymer-Modified Tile |
| Aachen Test | | |
| Change in dimensions after 24 hours conditioning | Wa. 1 N.A. | Wa. 1 − .02 |
| | Wa. 2 N.A. | Wa. 2 − .04 |
| | Wt. 1 N.A. | Wt. 1 + .02 |
| | Wt. 2 N.A. | Wt. 2 − .02 |
| Change in dimensions after 2 hours at 60° C. | Wa. 1 − .106 | Wa. 1 − .130 |
| | Wa. 2 − .121 | Wa. 2 − .016 |
| | Wt. 1 − .029 | Wt. 1 − .012 |
| | Wt. 1 − .016 | Wt. 2 − .022 |
| Change in dimensions after 2 hours water at 20° C. | Wa. 1 − .068 | Wa. 1 − .063 |
| | Wa. 1 − .084 | Wa. 2 − .020 |
| | Wt. 1 .001 | Wt. 1 − .033 |
| | Wt. 2 .002 | Wt. 2 − .031 |
| Change in dimensions after 24 hours 60° C. | Wa. 1 − .230 | Wa. 1 − .166 |
| | Wa. 2 − .244 | Wa. 2 − .186 |
| | Wt. 1 − .140 | Wt. 1 − .014 |
| | Wt. 2 − .072 | Wt. 2 − .056 |
| Change in dimensions after 48 hours reconditioning at 20° C., 65% RH | Wa. 1 − .266 | Wa. 1 − .126 |
| | Wa. 2 − .228 | Wa. 2 − .178 |
| | Wt. 1 − .117 | Wt. 1 − 0 |
| | Wt. 2 − .068 | Wt. 2 − .034 |

Limitations of +0.2% to −0.4% are generally acceptable, except for U.S.A. and France, +0.1% to −0.2%.

| Tuft Withdrawal Test | | |
|---|---|---|
| | Control Tile | Polymer-Modified Tile |
| Mean force required to remove tuft | 4.26 Newtons | 4.40 Newtons |

| Static Conductivity Test Conditions: 19.9° C., 29% Relative Humidity | | |
|---|---|---|
| | Control Tile | Polymer-Modified Tile |
| TBM | 1.2 × 10$^{11}$ ohms | 7.75 × 10$^{10}$ ohms |
| ICL | 1.2 × 10$^{11}$ ohms | 2.9 × 10$^{11}$ ohms |

Adhesion/Delamination Test

Again, the adhesion within the polymer-modified tile proved to be superior to that exhibited within the oxidized tile.

It has been found that satisfactory commercial carpet tiles having a bitumen backing composition prepared in accordance with the invention are prepared employing a straight run bitumen with a penetration value of 50 dmm and using an admixture of 3.6% recycled LDPE (density 0.90–0.92, MFI 0.7–1.5 grams per 10 minutes) and 1.6% w/w recycled HDPE (density 0.93–0.95, MFI 8.0–8.0 grams per 10 minutes) and with the use of 55% w/w of filler material,. The bitumen backing composition is applied to the back surface of a floor covering by a lick roller at an application temperature of 168° C. to 175° C. at a processing viscosity of about 25 to 30 pascal seconds at 165° C. The low and high density polyethylene-modified straight run bitumen blend provides a unique bitumen backing for floor laminates and provides energy savings, processing and manufacturing advantages.

What is claimed is:

1. A floor covering having a bitumen composition backing layer, which bitumen composition comprises:
    a) a dispersed phase of straight run bitumen; and
    b) a continuous phase of a mixture consisting essentially of low density polyethylene and a high density polyethylene, the low density polyethylene concentration less than about 12 percent by weight of the composition;
    the bitumen composition having a softening point of about 110° C. to 128° C. and a penetration value of about 10 dmm to 15 dmm.

2. A floor covering as set forth in claim 1 wherein said composition also comprises up to 10% by weight of the composition of blown bitumen as a dispersed phase.

3. The floor covering as set forth in claim 1 wherein said composition also comprises at least 40% by weight of the composition of a mineral filler material.

4. The floor covering as set forth in claim 1 wherein the composition contains about 3% to 9.5% by weight of the composition of low density polyethylene and from about 0.5% to 3.0% by weight of the composition of a high density polyethylene.

5. The floor covering as set forth in claim 1 wherein the high density polyethylene has a density of from 0.935 g/cm$^3$ to 0.970 g/cm$^3$, and the low density polyethylene has a density of from 0.90 g/cm$^3$ to 0.930 g/cm$^3$.

6. The floor covering as set forth in claim 1 wherein the composition contains from about 4% to about 12% by weight of the composition of the mixture of high density polyethylene and low density polyethylene.

7. The floor covering as set forth in claim 1 wherein the penetration value of the straight run bitumen is from about 40 dmm to 200 dmm.

8. The floor covering as set forth in claim 1 wherein the viscosity of the bitumen composition is from 6 pascal seconds to 100 pascal seconds at a temperature of 160° C. to 180° C.

9. A floor covering as set forth in claim 1 wherein the high and low density polyethylene have a melt flow index of 0.2 gr/10 min. to 10 gr/10 mins.

10. A floor covering as set forth in claim 1 wherein the floor covering comprises a carpet tile having a fibrous face surface and a back surface, the bitumen composition being bonded to the back surface.

11. A floor covering as set forth in claim 10 which includes a non-woven polypropylene secondary backing sheet bonded to the back surface of the bitumen composition.

12. A floor covering as set forth in claim 4 wherein the bitumen composition has a penetration value of 10 dmm to 12 dmm and a softening point of 110° C. to 120° C.

13. The floor covering of claim 1 wherein the composition contains from about 0.5% to 3.0% of the high density polyethylene.

14. A multiphase bitumen composition suitable for use as a backing layer in floor coverings comprising a straight run bitumen, and a polymer mixture consisting essentially of a high density polyethylene having a density between 0.935 g/cm$^3$ and 0.970 g/cm$^3$, the concentration of the high density polyethylene component being between about 0.5% and 3% by weight of the total composition, a low density polyethylene having a density of between 0.90 g/cm$^3$ and 0.930 g/cm$^3$, the concentration of the low density polyethylene component being between about 3% and 9.5% by weight of the total composition and an inert mineral filler which constitutes at least 40% by weight of the total composition, the straight run bitumen, the dispersed phase in a continuous phase of the high density and low density polyethylene.

15. The composition of claim 14 wherein the composition has a softening point of about 110° C. to 128° C.

16. The composition of claim 14 wherein the composition has a penetration value of about 10 dmm to 15 dmm.

17. The composition of claim 14 wherein the straight run bitumen has a penetration value of less than about 100 dram.

18. The composition of claim 14 wherein the high density polyethylene has a melt flow index of greater than about 0.2 gr/10 min. and the low density polyethylene has a melt flow index of greater than 2 gr/10 min.

* * * * *

UNITED STATES PATENT AND TRADEMARK OFFICE
CERTIFICATE OF CORRECTION

PATENT NO. : 5,366,779
DATED : November 22, 1994
INVENTOR(S) : Andrew Thompson

It is certified that error appears in the above-indentified patent and that said Letters Patent is hereby corrected as shown below:

Title Page
[63] After "abandoned", insert --, which is the national phase of PCT/GB91/00553, filed April 9, 1991, which is based on GB9008166.2, filed April 10, 1990--.

Column 8, line 24
Delete "dram" and insert --dmm--.

Signed and Sealed this

First Day of August, 1995

Attest:

Attesting Officer

BRUCE LEHMAN

Commissioner of Patents and Trademarks